(12) United States Patent
Zhao et al.

(10) Patent No.: US 11,126,765 B2
(45) Date of Patent: Sep. 21, 2021

(54) METHOD FOR OPTIMAL SCHEDULING DECISION OF AIR COMPRESSOR GROUP BASED ON SIMULATION TECHNOLOGY

(71) Applicant: DALIAN UNIVERSITY OF TECHNOLOGY, Liaoning (CN)

(72) Inventors: Jun Zhao, Liaoning (CN); Yang Liu, Liaoning (CN); Fan Zhou, Liaoning (CN); Zhongyang Han, Liaoning (CN); Linqing Wang, Liaoning (CN); Wei Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 20 days.

(21) Appl. No.: 16/928,672

(22) Filed: Jul. 14, 2020

(65) Prior Publication Data
US 2020/0342150 A1   Oct. 29, 2020

Related U.S. Application Data

(63) Continuation of application No. PCT/CN2019/112956, filed on Oct. 24, 2019.

(30) Foreign Application Priority Data

Jan. 2, 2019 (CN) .......................... 201910001583.2

(51) Int. Cl.
*G06F 30/20* (2020.01)
*G06N 7/08* (2006.01)
(Continued)

(52) U.S. Cl.
CPC ............... *G06F 30/20* (2020.01); *G06N 7/08* (2013.01); *G06F 2111/04* (2020.01); *G06F 2111/10* (2020.01); *G06F 2119/06* (2020.01)

(58) Field of Classification Search
CPC ................. G06F 30/20; G06F 2111/04; G06F 2119/06; G06F 2111/10; G06N 7/08
(Continued)

(56) References Cited

U.S. PATENT DOCUMENTS

| 2014/0324404 | A1* | 10/2014 | de la Torre-Bueno ...................... G06F 30/20 703/6 |
| 2017/0061444 | A1* | 3/2017 | Wall ....................... G06Q 50/06 |

(Continued)

FOREIGN PATENT DOCUMENTS

| CN | 102109823 A | 6/2011 |
| CN | 103049625 A * | 4/2013 |

(Continued)

OTHER PUBLICATIONS

Mu-jun Xie and Jian Liu, Design and simulation of air compressor performance controller, 2010 International Conference on Computer, Mechatronics, Control and Electrical Engineering, pp. 504-506 (Year: 2010).*

(Continued)

*Primary Examiner* — Justin C Mikowski
(74) *Attorney, Agent, or Firm* — Muncy, Geissler, Olds & Lowe, P.C.

(57) ABSTRACT

The present invention provides a method for an optimal scheduling decision of an air compressor group based on a simulation technology, which belongs to the technical field of information. The present invention uses expert experience to construct an air compressor energy consumption model sample set, and applies a least squares algorithm to learn relevant parameters of an air compressor energy consumption model; uses maximum energy conversion efficiency and minimum economic cost based on an equivalent electricity as target functions, and applies the simulation technology and a depth first tree search algorithm to solve a multi-target (Continued)

optimal scheduling model of the air compressor group; and finally uses a fuzzy logic theory to describe the preferences of decision makers, and introduces the decision maker preference information into interactive decision making, thereby assisting production staff to formulate safe, economical, efficient and environmentally friendly operation schemes to achieve an operation mode of maximum resource utilization of the air compressor group. The method also has wide application value in different industrial fields.

1 Claim, 4 Drawing Sheets

(51) Int. Cl.
  *G06F 111/04* (2020.01)
  *G06F 119/06* (2020.01)
  *G06F 111/10* (2020.01)
(58) Field of Classification Search
  USPC .............................................................. 703/2
  See application file for complete search history.

(56) References Cited

U.S. PATENT DOCUMENTS

| | | | | |
|---|---|---|---|---|
| 2018/0150575 A1* | 5/2018 | Kitagawa | ............ | G05B 23/0221 |
| 2019/0354071 A1* | 11/2019 | Turney | ................ | G05B 13/027 |

FOREIGN PATENT DOCUMENTS

| | | | | |
|---|---|---|---|---|
| CN | 104463360 A | 3/2015 | | |
| CN | 104751373 A | 7/2015 | | |
| CN | 106529021 A | 3/2017 | | |
| CN | 109164704 A | 1/2019 | | |
| CN | 109783916 A | 5/2019 | | |
| WO | WO-2012/026229 A2 | 3/2012 | | |
| WO | WO-2014172389 A1 * | 10/2014 | ......... | G05D 23/1917 |

OTHER PUBLICATIONS

Shenghui Wang, et. al., A Research on the Methods of Forecasting and Controlling for Air Compressor, 2010 International Conference on Electrical and Control Engineering, pp. 240-243 (Year: 2010).*
Wei et al., "Collaborative Optimization Method of the GWHP Central Air-conditioning System based on the Change of the Characteristics of Pipe Networks," Fluid Machinery, vol. 42, No. 9, 2014, pp. 66-71, 6 pages.
Chen et al., "An improved DPOP algorithm based on breadth first search pseudo-tree for distributed constraint optimization," Appl Intell (2017) vol. 47, pp. 607-623, 17 pages.
Bisson et al., "Parallel Distributed Breadth First Search on the Kepler Architecture," IEEE Transactions on Parallel and Distributed Systems, vol. 27, No. 7, Jul. 2016, 99. 2091-2102, 12 pages.
Gelly et al., "Monte-Carlo tree search and rapid action value estimation in computer Go," Artificial Intelligence, 2011, vol. 75, pp. 1856-1875, 20 pages.
Markvardsen et al., "Characterization of a hybrid Monte Carlo search algorithm for structure determination," Journal of Applied Crystallography, 2005, vol. 38, pp. 107-111, 5 pages.
Acosta-Mendoza et al., "A new algorithm for approximate pattern mining in multi-graph collections," Knowledge-Based Systems, 2016, vol. 109, pp. 198-207, 10 pages.
Li et al., "An extended depth-first search algorithm for optimal triangulation of Bayesian networks," International Journal of Approximate Reasoning, 2017, vol. 80, pp. 294-312, 19 pages.

* cited by examiner

Input variable
energy conversion efficiency membership function

Input variable
economic operation cost membership function

Output variable
importance factor membership function

METHOD FOR OPTIMAL SCHEDULING DECISION OF AIR COMPRESSOR GROUP BASED ON SIMULATION TECHNOLOGY

CROSS REFERENCE TO RELATED APPLICATIONS

This application is a Continuation of co-pending Application No. PCT/CN2019/112952, filed on Oct. 24, 2019, for which priority is claimed under 35 U.S.C. § 120; and this application claims priority of Application No. 201910001583.2 filed in China on Jan. 2, 2019 under 35 U.S.C. § 119, the entire contents of all of which are hereby incorporated by reference.

TECHNICAL FIELD

The present invention belongs to the technical field of information, relates to data-based dynamic modeling of air compressors, energy efficiency assessment of air compressor groups based on equivalent electricity, optimal solution of air compressor combination models based on depth first tree search algorithm, and intelligent optimization based on preference information and other theories, and is a method for an optimal scheduling decision of an air compressor group based on a simulation technology. The present invention uses expert experience to construct an air compressor energy consumption model sample set, and applies a least squares algorithm to learn relevant parameters of an air compressor energy consumption model; then uses maximum energy conversion efficiency and minimum economic cost based on equivalent electricity as target functions, and applies the simulation technology and the depth first tree search algorithm to solve a multi-target optimal scheduling model of the air compressor group; and finally uses a fuzzy logic theory to describe the preferences of decision makers, and introduces the preferences into interactive decision making, thereby assisting production staff to formulate safe, economical, efficient and environmentally friendly operation schemes to achieve an operation mode of maximum resource utilization of the air compressor group. The method also has wide application value in different industrial fields.

BACKGROUND

The air compressor has the characteristics of simple structure, low system maintenance and low component price, and is mainly power energy in industrial production processes such as metallurgy, industrial manufacturing and biological pharmacy. With the increasingly severe energy situation in China, the assessment of energy-saving potential and the optimal scheduling decisions have increasingly become the focus of attention of enterprises and researchers. The air compressor group is a time-varying, time-delay and nonlinear complex system. Due to unreasonable and untimely unit scheduling and other reasons, the resource utilization rate of an air compression system is low, energy consumption is high, and a large space for energy saving exists. Therefore, on one hand, reasonable energy saving potential assessment and optimal scheduling of an air compressor group can achieve structural optimization of production resources of the air compression system to satisfy air demands of different production users and provide basic support for production safety, energy saving and consumption reduction. On the other hand, the comprehensive operation efficiency of the air compressor group can be increased, and the air compressor group is operated at an optimal working point as much as possible to improve the energy saving and economy of the air compression system.

Common air compressor group scheduling is a nonlinear, non-convex, high-dimensional and multi-constrained complex optimization problem. Relevant solutions-intelligent search algorithms are generally classified into three categories: (1) breadth-first search. The algorithm is also known as width-first search or horizontal-first search, and traverses all nodes of a tree along the width of the tree. Existing results include distributed constraint optimization based on breadth first tree search (Chen, Ziyu, et al. (2017). An improved DPOP algorithm based on breadth first search pseudo-tree for distributed constraint optimization. Applied Intelligence, 47, 607-623.), application of parallel distributed breadth first search on the kepler architecture (Bisson, M., et al. (2016). Parallel distributed breadth first search on the kepler architecture. IEEE Transactions on Parallel & Distributed Systems, 27, 2091-2102.) and the like. (2) Monte Carlo Tree Search. The algorithm combines Monte Carlo simulation and a tree search algorithm, and uses computer statistical simulation or sampling to obtain approximate solutions of complex problems. Existing results include Monte-carlo tree search and rapid action value estimation in computer (Gelly, S., et al. (2011). Monte-carlo tree search and rapid action value estimation in computer go. Artificial Intelligence, 175, 1856-1875.), characterization of a hybrid monte carlo tree search method for crystal structure determination (Shankland, K., et al. (2005). Characterization of a hybrid monte carlo search algorithm for structure determination. Journal of Applied Crystallography, 38, 107-111.) and the like. (3) Depth first tree search. The purpose of the algorithm is to reach all nodes of a searched structure. Existing results include application in optimal triangulation of Bayesian networks (Li, C., et al. (2017). An extended depth-first search algorithm for optimal triangulation of Bayesian networks. International Journal of Approximate Reasoning, 80, 294-312.), application of depth first search in approximate pattern mining in multi-graph collections (Acosta-Mendoza, N. (2016). A new algorithm for approximate pattern mining in multi-graph collections. Knowledge-Based Systems, 109, 198-207.) and the like.

Besides the above problems and limitations, how to combine the characteristics of a device model with an intelligent optimal algorithm and realize quick and accurate solution of the air compressor group is the focus and difficulty of current related research. A plurality of air compressor groups exist in a metallurgical energy system, and are distributed in different positions of a plant area to realize multi-unit cross area energy supply through a pipe network. The difficulties in realizing the reasonable configuration of different air compressor groups in different regions are: (1) the device mechanisms and parameters of different types and models of air compressors are different; thus, it is difficult to establish a universal air compressor mechanism model. (2) How does an online energy efficiency assessment model of the air compressor group takes into account the "quality" and "quantity" of energy types. (3) From practical application, it is very difficult to combine the characteristics of the device model with the depth first tree search algorithm to quickly and accurately solve a multi-target optimal model for the air compressor group. (4) The introduction of decision maker preference information into human-computer interactive dynamic intelligent optimal decision making is a challenging job. There is still no effective method to simultaneously solve all the above problems systematically.

SUMMARY

The present invention aims to solve the problem of an optimal scheduling decision of an air compressor group. The present invention firstly constructs an air compressor model sample set based on expert experience, and applies a least squares algorithm to online learn relevant parameters of an air compressor energy consumption model; then uses maximum energy conversion efficiency and minimum economic cost based on an equivalent electricity method as target functions, and applies the simulation technology and the depth first tree search algorithm to solve a multi-target optimal scheduling model of the air compressor group; and finally uses a fuzzy logic theory to describe the preferences of decision makers, and introduces the preferences into interactive decision making. The present invention can provide a safe and economic scheduling solution for on-site staff, thereby improving the resource utilization rate of the air compressor group.

The technical solution of the present invention is:

A method for an optimal scheduling decision of an air compressor group based on a simulation technology, as shown in FIG. 1, comprises the following specific steps:

(1) Construction of an air compressor energy consumption model: expert experience is used to select the intake flow rate, diffusion flow rate and motor current of each air compressor within a period of time as a standard sample set of the air compressor energy consumption model; a least square method is used to learn the parameters of the air compressor energy consumption model, i.e., a relationship between the intake flow rate and energy consumption of each air compressor.

(2) Construction of an energy efficiency assessment model for an air compressor group: the air compressor group is abstracted as a "black box" model, wherein input is electric energy; output is produced compressed air; and diffusion is the amount of diffusion of the air compressors in the group through a diffusion valve; the input, the output and the diffusion of the air compressor group are converted into equivalent electricity based on an equivalent electricity method, so as to assess the energy efficiency of the air compressor group.

(3) Multi-target optimal scheduling modeling and solution for air compressor group based on simulation and depth first tree search algorithm: the established energy efficiency assessment and scheduling model for the air compressor includes economic cost, air compressor energy efficiency and other target functions, so as to solve a multi-target optimal scheduling model for the air compressor in combination with the characteristics of a production technology by using a simulation technology and the depth first tree search algorithm and simulate the economy and comprehensive energy conversion efficiency of the air compressor group.

(4) Introduction of an intelligent optimal decision of decision maker preference information: each assessment index value is obtained by using the simulation technology; and the decision maker preference information is introduced into the solving process of Pareto optimal solution so that the result of the intelligent optimal decision is more reasonable, wherein the decision maker preference information is described by a fuzzy rule.

The present invention has the effects and benefits: the multi-target optimal model for the air compressor group is quickly solved through close combination of the features of working conditions of the air compressors and scheduling targets by using the simulation technology and the depth first tree search algorithm, so as to realize the economy and comprehensive energy efficiency simulation of the optimal scheduling solution and effectively reduce the scheduling blindness of the air compressor group, so as to further realize economic, safe and efficient operation of the air compressor group. The present invention makes full use of a data modeling method to establish a universal air compressor energy consumption model, comprehensively considers "quality" and "quantity" of the energy types to establish the comprehensive energy efficiency assessment model of the air compressor based on the equivalent electricity method, and quickly solves the multi-target optimal scheduling model of the air compressor group through a combination of the simulation technology and the depth first tree search algorithm in conjunction with the actual operation state of the air compressor device. In addition, the present invention uses the fuzzy rule to describe the decision maker preferences and reasonably introduces the decision maker preferences into the process of dynamic intelligent decision making.

DESCRIPTION DRAWINGS

Figure 3A:
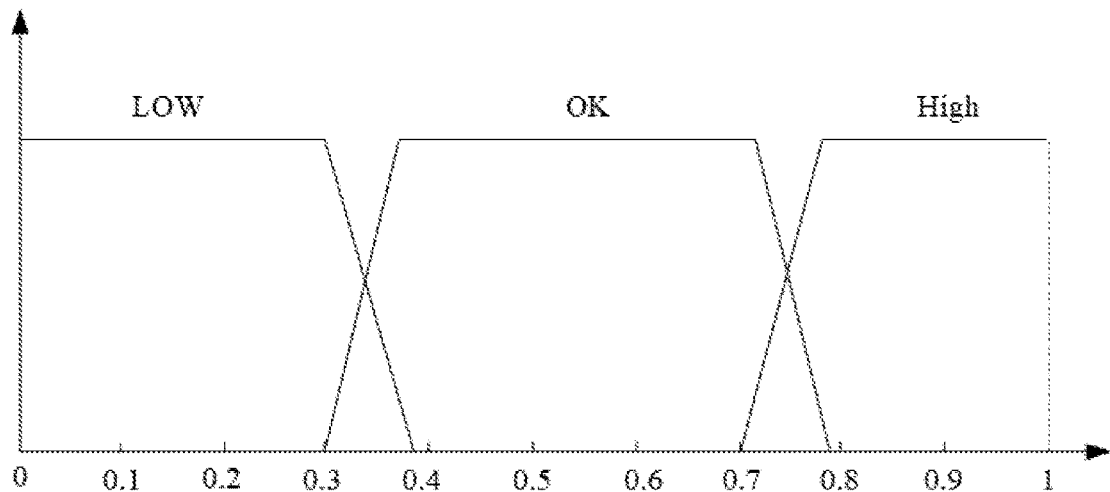
Figure 3B:
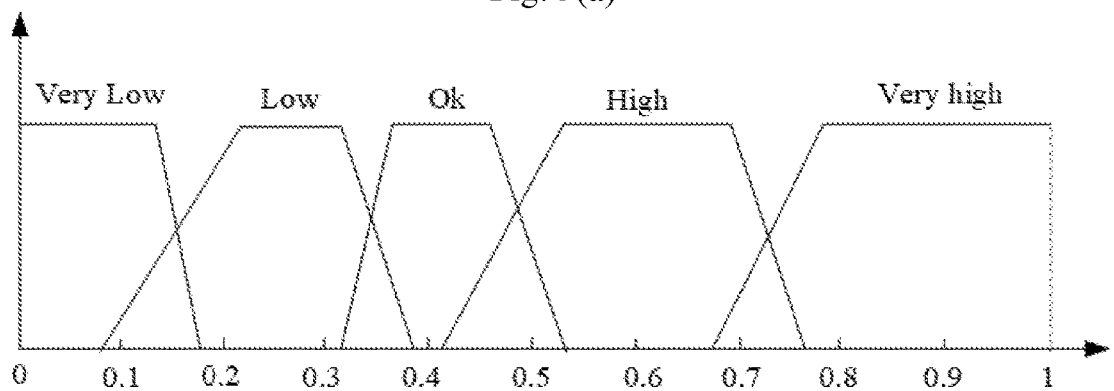
Figure 3C:
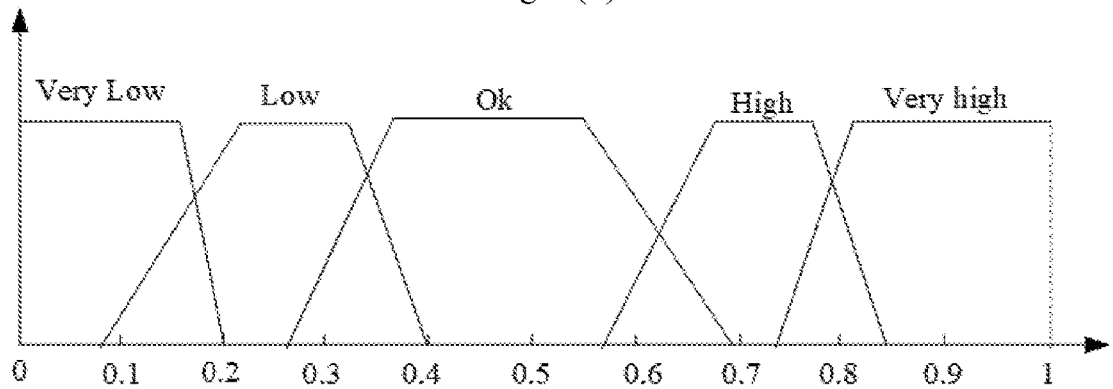

FIG. 3 shows description of fuzzy membership of expert preference information in the present invention; FIG. 3(a) shows a fuzzy membership function of input variable energy conversion efficiency; FIG. 3(b) shows a fuzzy membership function of input variable economic operation cost; FIG. 3(c) shows a fuzzy membership function of an output variable importance factor.

Figure 4:
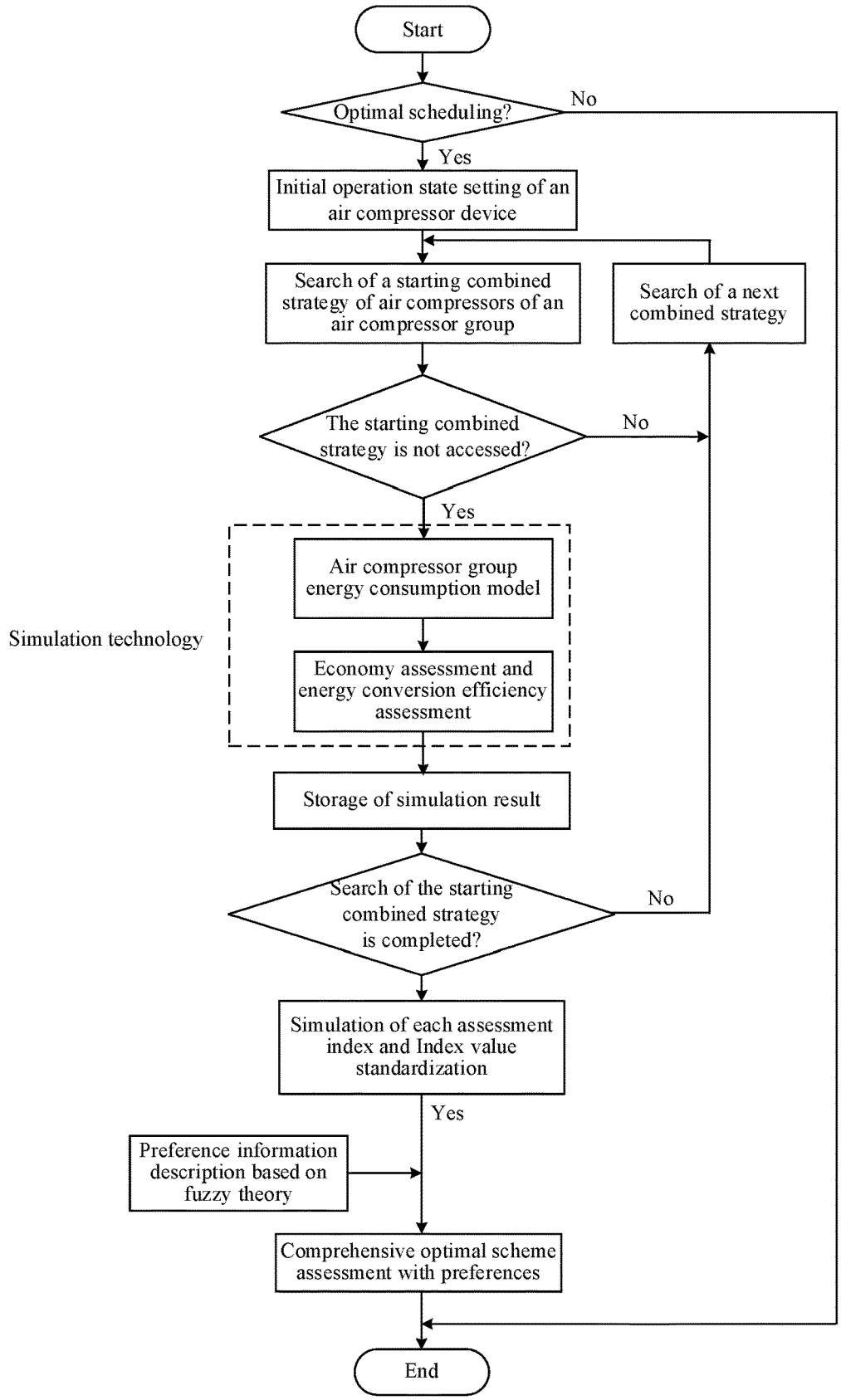

FIG. 4 is a flow chart of specific implementation of the present invention.

DETAILED DESCRIPTION

Figure 1:
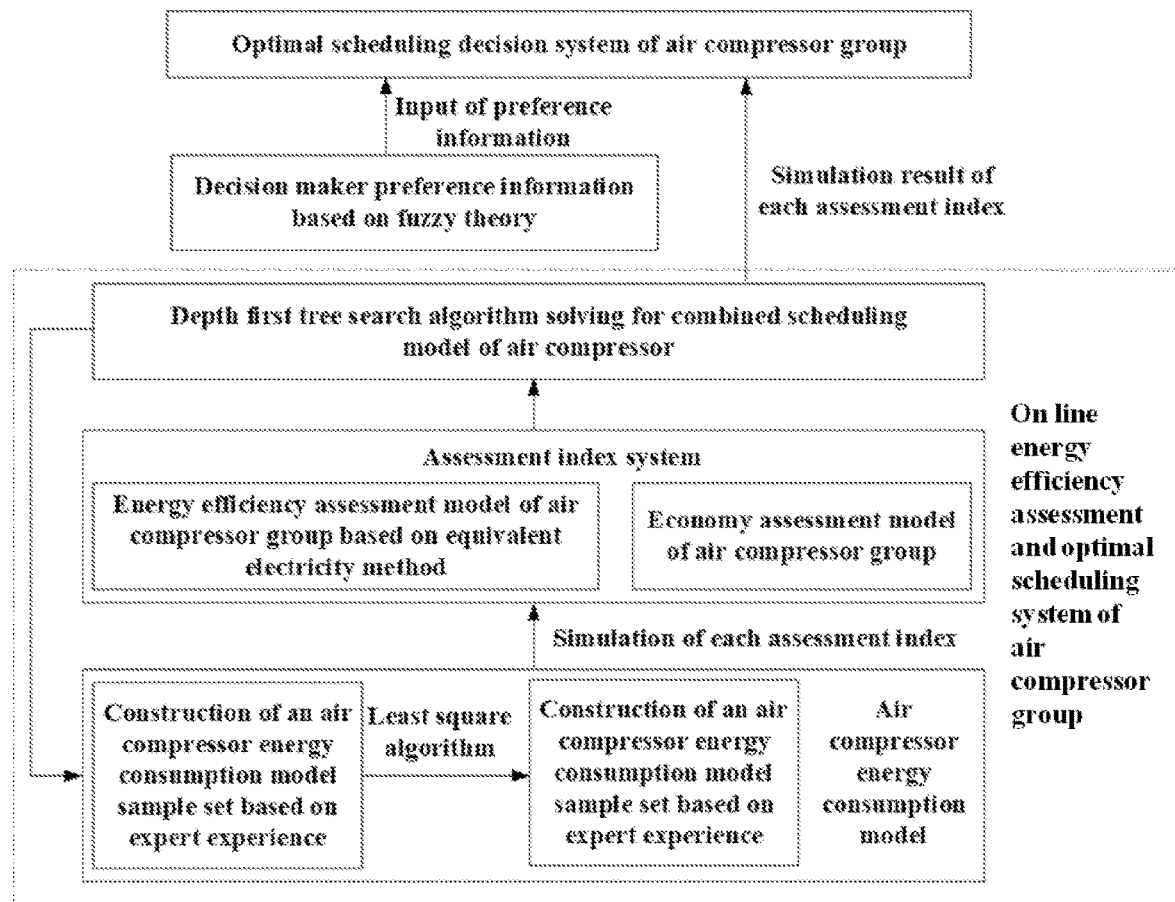
FIG. 1 is a flow chart of each module in the present invention.
Figure 2:
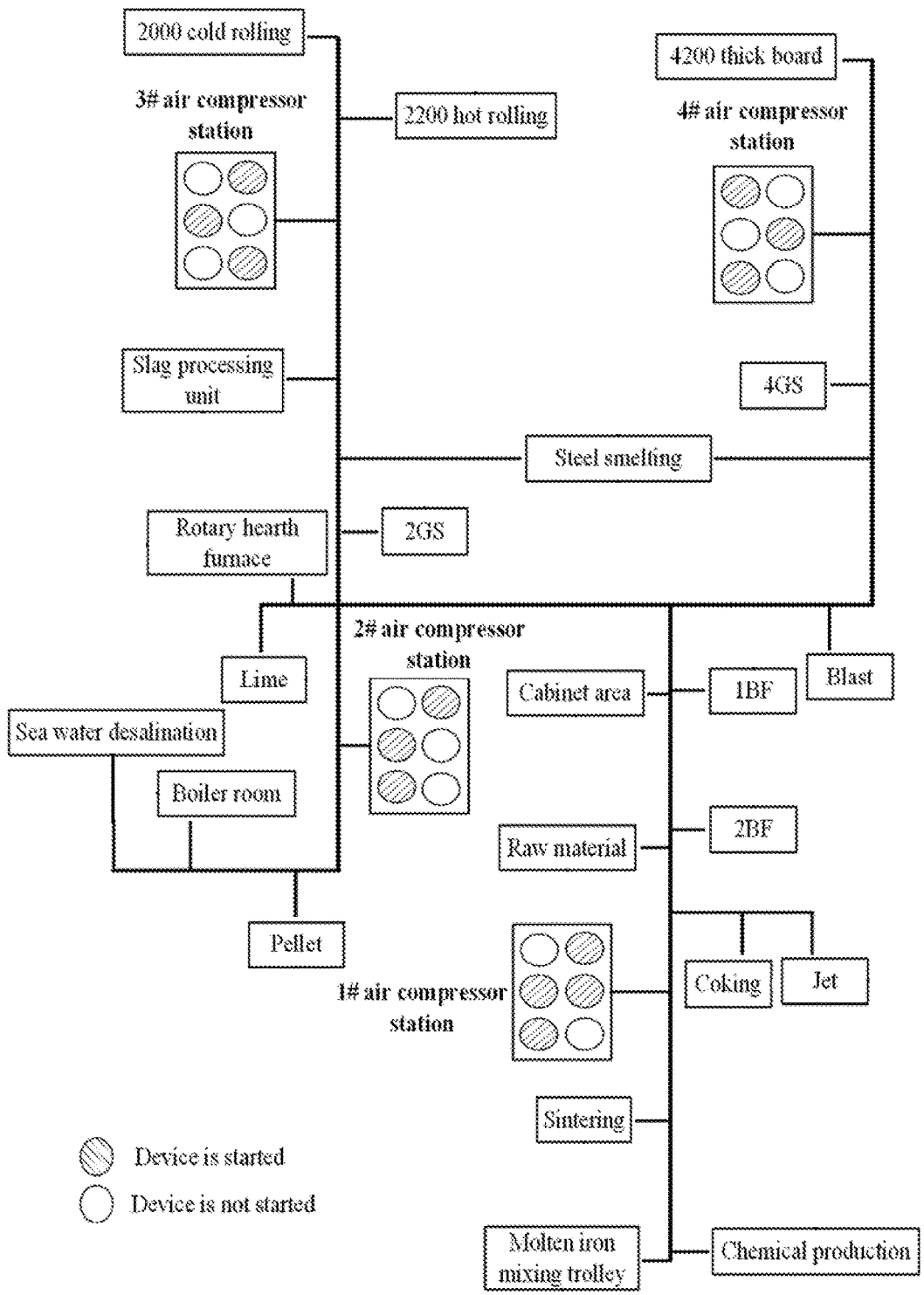
FIG. 2 is a composition and plant area distribution diagram of an air compressor group in the present invention.

To better understand the technical solution of the present invention, the embodiments of the present invention will be described in detail in combination with FIG. 2 and FIG. 3 by taking scheduling of an air compressor group in a metallurgical enterprise as an example.

A method for an optimal scheduling decision of an air compressor group based on a simulation technology comprises the following steps:

Step 1: construction of an air compressor energy consumption model and parameter learning obtaining intake flow rate, diffusion flow rate and motor current of a j-th air compressor of an i-th air compressor group within a period of time from a database; based on expert experience, selecting part of samples from the above time period to construct a sample set of the air compressor energy consumption model; successively initializing the sample set of each air compressor in different air compressor groups according to the above mode;

In one alternate operation cycle, setting the intake flow rate of the j-th air compressor of the i-th air compressor group as $v_{ij}$; and representing the energy consumption of the air compressor, which is different in three phases of start up phase, load phase and unload phase, by a piecewise function as follows:

$$E_{ij} = \begin{cases} E_{ij}^{start\ up} & \text{the air compressor is in a start up phase} \\ E_{ij}^{load} = \sqrt{3}\, U_{ij} \Psi(v_{ij}) \cos\varphi_{ij} & \text{the air compressor is in a load phase} \\ E_{ij}^{unload} & \text{the air compressor is in an unload phase} \end{cases} \quad (1)$$

wherein the power consumptions of the j-th air compressor of the i-th air compressor group in the start up phase $E_{ij}^{start\ up}$ and the unload phase $E_{ij}^{unload}$ are fixed values and can be respectively obtained by integrating energy consumption during the start and stop time periods; $U_{ij}$ and $\varphi_{ij}$ respectively represent the voltage of the j-th air compressor of the i-th air compressor group and a power factor of a drive motor; $\Psi(\upsilon_{ij})$ represents a relationship between the intake flow rate of the j-th air compressor of the i-th air compressor group and motor current, and the relationship therebetween is obtained by using a least square algorithm to fit the sample set of the energy consumption model of the air compressor group.

Step 2: on line energy efficiency assessment and optimal scheduling system modeling of air compressor group 1) Target function ① Comprehensive energy conversion efficiency maximization based on equivalent electricity $$\max J_{P_{sp}} = \Sigma_{i=1}^{m} \Sigma_{j=1}^{S_i} \hat{W}_{ij}^{load} / \Sigma_{i=1}^{m} \alpha_1 \beta_1 q_i \Sigma_{j=1}^{S_i} \upsilon'_{ij} \quad (2)$$

wherein $J_{P_{sp}}$ represents a target function of energy conversion efficiency of m air compressor groups based on equivalent electricity; $S_i$ represents a starting strategy of the air compressors in the i-th air compressor group; $\hat{W}_{ij}^{load}$ represents the loading power of the j-th air compressor of the i-th air compressor group under the starting strategy $S_i$; $\alpha_1$ and $\beta_1$ are respectively a coefficient of compressed air converted into standard coal and a coefficient of equivalent electricity converted from standard coal; $q_i$ is a loss coefficient of the air compressor in the i-th air compressor group; and $\upsilon'_{ij}$ represents the intake flow rate of the j-th air compressor in the i-th air compressor group under the starting strategy $S_i$;

② Minimal economic operation cost $$\min J_{P_{ec}} = \zeta \int_{t0}^{t1} \Sigma_{i=1}^{m} \Sigma_{j=1}^{S_i} \hat{W}_{ij}^{load} dt + \Sigma_{i=1}^{m} \Sigma_{j=1}^{S_i} (\hat{W}_{ij}^{start\ up} + \hat{W}_{ij}^{unload} + \varepsilon_{ij}) \quad (3)$$

wherein $J_{P_{ec}}$ represents the target function of the economic cost of the air compressors in m air compressor groups; $\zeta$ represents the unit price of electric energy (kw/yuan); $\int_{t0}^{t1} \Sigma_{i=1}^{m} \Sigma_{j=1}^{S_i} \hat{W}_{ij}^{load} dt$ represents the power consumption (kw) of m air compressor groups under the starting strategy $S_i$ within a $(t_0, t_1)$ time period, $\hat{W}_{ij}^{start\ up}$, and $\hat{W}_{ij}^{unload}$ and $\varepsilon_{ij}$ respectively represent the starting cost, unloading cost and depreciation cost of the j-th air compressor in the i-th air compressor group.

2) Constraint conditions of target function $$s.t. \begin{cases} Q_{ij}^{min} \leq Q_{ij} \leq Q_{ij}^{max} & ① \\ \sum_{i=1}^{m} \sum_{j=1}^{S_i} Q_{ij} \geq Q_{need} & ② \\ R_{ij}^{min} \leq \upsilon'_{ij} \leq R_{ij}^{max} & ③ \\ T_{ij}^{L} < |U_{ij,t} - U_{ij,t-1}| < T_{ij}^{H} & ④ \\ H^L < H^0 + \Delta H < H^H & ⑤ \end{cases} \quad (4)$$

① Opening constraint of intake flow rate of air compressor:

$R_{ij}^{min}$ and $R_{ij}^{max}$ respectively represent maximum and minimum constraints on the intake flow rate of the j-th air compressor in the i-th air compressor group;

② Matching constraints of gas production and gas consumption of air compressor group:

$\Sigma_{i=1}^{m} \Sigma_{j=1}^{S_i} Q_{ij}$ represents the gas production of $\Sigma_{i=1}^{m} S_i$ air compressors in the m air compressor groups, and $Q_{need}$ represents the air demand of air demand users;

③ Gas production constraints of air compressor $Q_{ij}^{min}$ and $Q_{ij}^{max}$ respectively represent maximum and minimum constraints on the outtake flow rate of the j-th air compressor in the i-th air compressor group;

④ Operation time constraint of air compressor $T_{ij}^{L}$ and $T_{ij}^{H}$ respectively represent minimum and maximum operation time constraints of the j-th air compressor of the i-th air compressor group, and the constraints aim to avoid frequent start and stop of the air compressor and long-term use of the air compressor;

⑤ Change constraints of pipe network pressure $H^L$ and $H^H$ are respectively upper and lower pressure limits of a pipe network; $H^0$ represents an initial state of outlet pressure of the air compressor group; and $\Delta H$ is a corresponding change amount.

Step 3: solving of an optimal scheduling model of the air compressor group based on a simulation technology and a depth first tree search algorithm The patent proposes a depth first tree search algorithm based on the simulation technology to quickly obtain the simulation results of a combined scheme of the air compressor group. The solving steps of the algorithm are as follows:

4) initializing an operation state: each air compressor of the air compressor group is regarded as a node; site personnel set the state of the node according to the production conditions or production plan; state State=1 represents that the air compressor is in a normal state; state State=0 represents that the air compressor is in a maintenance or fault state; the air compressor at State=0 shall not be used as an alternative device for combined scheduling optimal solution;

5) Simulating a combined scheme: each combined scheduling scheme is subjected to numerical simulation of economy and energy conversion efficiency; if the combined scheduling scheme is searched, a next combined scheduling scheme is simulated;

6) Storing simulation results: the simulation values of the economy and the energy conversion efficiency of each combined scheduling scheme are stored; after all the combined scheduling schemes are traversed, an intelligent optimal decision analysis process based on decision maker preference information is conducted.

Step 4: intelligent optimal decision based on decision maker preference information setting two assessment indexes of energy conversion efficiency and economy to assess k scheduling schemes, and setting the eigenvalue of a-th index of b-th assessment object as $x_{ab}$ to obtain a characteristic matrix $X=(x_{ab})_{2 \times k}$ of the scheduling scheme; standardizing the obtained characteristic matrix to eliminate differences among indexes due to different dimensions; obtaining the matrix $\hat{X}$ obtained after standardization, with methods for standardizing the values of X as follows:

$$\hat{x}_{ab} = \frac{x_{ab} - \min_{b} x_{ab}}{\max_{b} x_{ab} - \min_{b} x_{ab}}, b \in [1,k], a \in I_1 \quad (5)$$

$$\hat{x}_{ab} = \frac{\min_{b} x_{ab} - x_{ab}}{\max_{b} x_{ab} - \min_{b} x_{ab}}, b \in [1,k], a \in I_2 \quad (6)$$

wherein $I_1$ is an energy conversion efficiency index of the air compressor, and $I_2$ is an economy operation cost index.

An intelligent optimal scheduling decision system of the air compressor group uses fuzzy reasoning to describe uncertain information such as index weight change caused by the preference information of scheduler and complex working conditions, thereby increasing the feasibility and validity of a scheduling decision plan. The present invention uses a Mamdani fuzzy model widely used to describe the uncertain information of an industrial production system, and fuzzy rules can be defined as:

Rule 1: IF $\hat{x}_{k1}$ is $A_{f1}$ and $\hat{x}_{k2}$ is $A_{f2}$, Then $P$ is $B_{f1}$ (7)

wherein $\hat{x}_{k1}$ and $\hat{x}_{k2}$ are respectively input values of energy conversion efficiency and economic operation index standardization, and P represents an importance factor; $A_{f1}$, and $A_{f2}$ respectively represent the fuzzy subsets of the energy conversion efficiency and the economic operation, and $B_{f1}$, represents the fuzzy subset of the importance factor. The fuzzy rules are shown in Table 1:

TABLE 1

Table of Fuzzy Rules

| | | Economy cost | | | | |
|---|---|---|---|---|---|---|
| | | Very low | Low | OK | High | Very high |
| Energy conversion efficiency | High | Very high | Very high | OK | Low | Very low |
| | OK | High | High | OK | High | Very high |
| | Low | OK | OK | OK | Very high | Very high |

Calculation formulas of multi-target comprehensive evaluation indexes with preference information are:

$$y_k = \hat{x}_{k1} P_k + \hat{x}_{k2}(1 - P_k) \quad (8)$$

$$y = \text{Max}(y_1, y_2, \ldots, y_k) \quad (9)$$

wherein a largest value of Y represents a comprehensive optimal plan of the scheduling decision; $y_k$ represents a comprehensive assessment value of the k-th scheduling scheme; and $P_k$ represents the importance factor of the energy conversion efficiency.

By taking an air compressor group system of a metallurgical enterprise as an example, it is assumed that the compressed gas is transmitted in a pipeline in an ideal state. The total demand of air compressor users is set manually. Without considering the differences in the power consumption price of the air compressor groups at different times, the electricity price is calculated according to 0.458 yuan/kWh. Table 2 provides comparison of effects of the method of the present invention and a manual scheduling method.

TABLE 2 provides comparison of effects of the method of the present invention and a manual scheduling method

| Total air demand of users (kNm³/min) | Method | Selected scheduling scheme | | Economic cost (yuan/h) | Comprehensive energy efficiency (%) |
|---|---|---|---|---|---|
| 160 | Manual scheduling | 1# air compressor station | ①⑥ | 1645.86 | 89.25 |
| | | 2# air compressor station | ②③⑤ | | |
| | | 3# air compressor station | ①②⑤⑥ | | |
| | | 4# air compressor station | ①②④⑤⑥ | | |
| | The present invention | 1# air compressor station | ①⑥ | 1633.17 | 92.12 |
| | | 2# air compressor station | ②③ | | |
| | | 3# air compressor station | ①②③⑥ | | |
| | | 4# air compressor station | ①②③④⑤⑥ | | |
| 170 | Manual scheduling | 1# air compressor station | ①⑥ | 1773.98 | 88.7 |
| | | 2# air compressor station | ②③⑤ | | |
| | | 3# air compressor station | ①②③④⑥ | | |
| | | 4# air compressor station | ②③④⑤⑥ | | |

TABLE 2-continued provides comparison of effects of the method of the present invention and a manual scheduling method

| Total air demand of users (kNm³/min) | Method | Selected scheduling scheme | | Economic cost (yuan/h) | Comprehensive energy efficiency (%) |
|---|---|---|---|---|---|
| 180 | The present invention | 1# air compressor station | ①⑥ | 1749.58 | 91.34 |
|  |  | 2# air compressor station | ③⑤ |  |  |
|  |  | 3# air compressor station | ①②③④⑥ |  |  |
|  |  | 4# air compressor station | ①②③④⑤⑥ |  |  |
|  | Manual scheduling | 1# air compressor station | ①⑥ | 1885.4 | 89.32 |
|  |  | 2# air compressor station | ②③④ |  |  |
|  |  | 3# air compressor station | ①②③④⑤⑥ |  |  |
|  |  | 4# air compressor station | ①②③⑤⑥ |  |  |
|  | The present invention | 1# air compressor station | ①⑥ | 1873.8 | 91.32 |
|  |  | 2# air compressor station | ②⑥ |  |  |
|  |  | 3# air compressor station | ①②③④⑤⑥ |  |  |
|  |  | 4# air compressor station | ①②③④⑤⑥ |  |  |

The invention claimed is:

1. A method for an optimal scheduling decision of an air compressor group based on a simulation technology, comprising the following steps:

obtaining intake flow rate, diffusion flow rate and motor current of an air compressor within a time period from a database; based on experience, selecting part of samples from the time period to construct a sample set of an air compressor energy consumption model; and successively initializing a sample set of each air compressor energy consumption model in different air compressor groups;

in one alternate operation cycle, setting an intake flow rate of the air compressor as $\upsilon$; and representing energy consumption of the air compressor, which is different in three phases of start up phase, load phase and unload phase, by a piecewise function as follows:

$$E = \begin{cases} E^{start\ up} \\ E^{load} = \sqrt{3}\ U\Psi(\upsilon)\cos(\varphi) \\ E^{unload} \end{cases} \quad (1)$$

wherein the energy consumptions of the air compressor in a start-up phase $E^{start\ up}$ and an unload phase $E^{unload}$ are respectively obtained by integrating energy consumption during the start and stop time periods; U and $\varphi$ respectively represent the voltage of the air compressor and a power factor of a drive motor; $\Psi(\upsilon)$ represents a relationship between the intake flow rate of the air compressor and motor current, and the relationship is obtained by using a least square algorithm to fit the sample set of the air compressor energy consumption model;

determining comprehensive energy conversion efficiency maximization based on equivalent electricity from the following equation:

$$\max J_{P_{sp}} = \Sigma_{i=1}^{m}\Sigma_{j=1}^{S_i}\hat{W}_{ij}^{load}/\Sigma_{i=1}^{m}\alpha_1\beta_1 q_i\Sigma_{j=1}^{S_i}\upsilon'_{ij} \quad (2)$$

wherein i and j respectively represent the label of air compressor in the air compressor group and the air compressor group located in an industrial park; $J_{P_{sp}}$ represents a target function of energy conversion efficiency of the air compressor groups based on equivalent electricity; $S_i$ represents a starting strategy of the air compressors; $\hat{W}_{ij}^{load}$ represents a loading power of the air compressor under the starting strategy $S_i$; $\alpha_1$ and $\beta_1$ respectively represent the coefficient of compressed air and equivalent electricity converted into standard coal; $q_i$ represents a loss coefficient of the air compressor; and $\upsilon'_{ij}$ represents the intake flow rate of the air compressor under the starting strategy $S_i$;

determining minimal economic operation cost from the following equation:

$$\min J_{P_{ec}} = \zeta \int_{t0}^{t1} \Sigma_{i=1}^{m} \Sigma_{j=1}^{S_i} \hat{W}_{ij}^{load} dt + \Sigma_{i=1}^{m} \Sigma_{j=1}^{S_i} (\hat{W}_{ij}^{start\ up} + \hat{W}_{ij}^{unload} + \varepsilon_{ij}) \quad (3)$$

wherein $J_{P_{ec}}$ represents a target function of an economic cost of the air compressors; $\zeta$ represents a unit price of electric energy (kw/yuan); $\int_{t0}^{t1} \Sigma_{i=1}^{m} \Sigma_{j=1}^{S_i} \hat{W}_{ij}^{load} dt$ represents power consumption (kw) of m air compressor groups under the starting strategy $S_i$ within a $(t_0, t_1)$ time period; $\hat{W}_{ij}^{start\ up}$, $\hat{W}_{ij}^{unload}$ and $\varepsilon_{ij}$ respectively represent the starting cost, unloading cost and depreciation cost of the air compressor;

wherein constraint conditions of target function are defined from the following formulas:

$$Q_{ij}^{min} \le Q_{ij} \le Q_{ij}^{max} \quad (4)$$

wherein the formula (4) defines gas production constraints of air compressor, where $Q_{ij}^{min}$ and $Q_{ij}^{max}$ respectively represent the maximum and minimum constraints on the outtake flow rate of the air compressor;

$$\Sigma_{i=1}^{m} \Sigma_{j=1}^{S_i} Q_{ij} \ge Q_{need} \quad (5)$$

wherein the formula (5) defines matching constraints of gas production and consumption of air compressor group, where $\Sigma_{i=1}^{m} \Sigma_{j=1}^{S_i} Q_{ij}$ represents the gas production of $\Sigma_{i=1}^{m} S_i$ air compressors in the air compressor groups, and $Q_{need}$ represents the demand of air users;

$$R_{ij}^{min} \le \upsilon'_{ij} \le R_{ij}^{max} \quad (6)$$

wherein the formula (6) defines an opening constraint of intake flow rate of air compressor, where $R_{ij}^{min}$ and $R_{ij}^{max}$ respectively represent maximum and minimum constraints on the intake flow rate of the air compressor;

$$T_{ij}^{L} \le |T'_{ij,t} - T'_{ij,t-1}| \le T_{ij}^{H} \quad (7)$$

wherein the formula (7) defines an operation time constraint of air compressor, where $T_{ij}^{L}$ and $T_{ij}^{H}$ respectively represent minimum and maximum operation time constraints of the air compressor, and the constraints aim to avoid frequent start and stop of the air compressor and long-term use of the air compressor, $T'_{ij,t-1}$ and $T'_{ij,t}$ respectively represent the beginning and the end of operation time in the air compressor;

$$H^L < H^0 + \Delta H < H^H \quad (8)$$

wherein the formula (8) defines the constraints of pipe network pressure, where $H^L$ and $H^H$ respectively represent upper and lower pressure limits of a pipe network; $H^0$ and $\Delta H$ respectively represent an initial state of outlet pressure of the air compressor group and a corresponding change amount;

performing a depth first tree search algorithm based on the simulation technology and obtaining simulation results of a combined scheme of the air compressor group by:

1) initializing an operation state in which each air compressor of the air compressor group is regarded as a node; site personnel set a state of the node according to production conditions or production plan; the air compressor is in a normal state, a maintenance state or a fault state; the air compressor in the maintenance state or the fault state is not be used as an alternative device for combined scheduling optimal solution;

2) simulating a combined scheme in which each combined scheduling scheme is subjected to numerical simulation of economy and energy conversion efficiency; if the combined scheduling scheme is searched, a next combined scheduling scheme is simulated;

3) storing simulation results in which the simulation of economy and energy conversion efficiency of each combined scheduling scheme is stored; after all the combined scheduling schemes are traversed, an intelligent optimal decision analysis process based on decision maker preference information is conducted;

setting two assessment indexes of the enemy conversion efficiency and the economy to assess k scheduling schemes, and setting an eigenvalue of a-th index of b-th assessment object as $x_{ab}$ to obtain a characteristic matrix $X=(x_{ab})_{2 \times k}$ of the scheduling scheme; standardizing the obtained characteristic matrix to eliminate differences among indexes in different dimensions; obtaining matrix $\hat{X}$ obtained after standardization based on the following equations:

$$\hat{x}_{ab} = \frac{x_{ab} - \min_{b} x_{ab}}{\max_{b} x_{ab} - \min_{b} x_{ab}}, b \in [1, k], a \in I_1 \quad (9)$$

$$\hat{x}_{ab} = \frac{\min_{b} x_{ab} - x_{ab}}{\max_{b} x_{ab} - \min_{b} x_{ab}}, b \in [1, k], a \in I_2 \quad (10)$$

wherein $I_1$ and $I_2$ respectively represent an energy conversion efficiency and an economy operation cost of the air compressor;

by using a fuzzy rule of Mamdani model, which can be defined as:

Rule 1: IF $\hat{x}_{k1}$ is $A_{f1}$ and $\hat{x}_{k2}$ is $A_{f2}$, Then $P$ is $B_{f1}$ (11)

wherein $\hat{x}_{k1}$ and $\hat{x}_{k2}$ respectively represent input of energy conversion efficiency and economic index standardization, and P represents an importance factor; $A_{f1}$ and $A_{f2}$ respectively represent fuzzy subsets of the energy conversion efficiency and the economic operation, and $B_{f1}$ represents a fuzzy subset of an importance factor; calculating multi-target comprehensive evaluation indexes with preference information from the following equations:

$$y_k = \hat{x}_{k1} P_k + \hat{x}_{k2}(1 - P_k) \quad (12)$$

$$y = \text{Max}(y_1, y_2, \ldots y_k) \quad (13)$$

wherein a largest value of y represents a comprehensive optimal plan of a scheduling decision; $y_k$ represents a comprehensive assessment value of the k-th scheduling scheme; and $P_k$ represents the importance factor of the energy conversion efficiency.

* * * * *